Dec. 25, 1973  H. F. WELLS  3,781,390
CONTINUOUS MOLDING METHOD
Original Filed Jan. 22, 1969  9 Sheets-Sheet

United States Patent Office 3,781,390
Patented Dec. 25, 1973

3,781,390
CONTINUOUS MOLDING METHOD
Howard F. Wells, Rochester, N.Y., assignor to The Schlegel Manufacturing Co., Inc., Rochester, N.Y.
Application Jan. 22, 1969, Ser. No. 814,868, now Patent No. 3,700,368, which is a continuation-in-part of abandoned application Ser. No. 460,404, June 1, 1965. Divided and this application July 19, 1972, Ser. No. 273,172
Int. Cl. B29c 5/10
U.S. Cl. 264—47
8 Claims

ABSTRACT OF THE DISCLOSURE

A continuous foamed strip molding method uses two continuous lengths of mold halves that snap-fit together to hold the foamed strip and are flexible enough to be driven in a curved path with one mold half inside the other for high speed and adequate cure time in relatively small space.

RELATED APPLICATIONS

This application is a divisional application of my copending application, Ser. No. 814,868 filed Jan. 22, 1969, now U.S. Pat. No. 3,700,368 issued Oct. 24, 1972, entitled: Continuous Molding Apparatus, which application was a continuation-in-part of my parent application, Ser. No. 460,404, filed June 1, 1965 abandoned upon the filing of the continuation-in-part application.

BACKGROUND OF THE INVENTION

This invention relates to improved molding of foamable materials such as foamed plastics or synthetic resins and the like, and especially to continuous molding of such materials at speeds higher than any previously achieved by using a mold formed of continuous strips of relatively long lengths which are driven through a curved path for curing of the foamed product.

Continuous molding of foamed materials such as foamed polyurethane has been accomplished by prior art devices using molds formed of continuous strips, but the foaming and curing of the molded product has been accomplished only along a linear path, and continuous strip mold sections have required external support to contain and support the foamed product during its formation and curing. Also, foamed synthetic resins such as polyurethane presently require minimum curing time during which they are heated to a desired temperature before they can be safely removed from the mold in which they are foamed. The curing time-temperature requirement has limted prior art devices to relatively slow molding speeds. Since lengths of foam-molded material are useful in large quantities for puspores such as weatherstripping in places such as around windows, doors, and in automobile bodies, and for uses such as windlaces, gaskets, seals, etc., it is important to be able to manufacture various configurations of continuous strips of foamed material in large quantities and at economical cost.

Accordingly, it is an object of this invention to mold foamed materials continuously in strip form at high speeds to provide economical molded products of high quality.

Another object of the invention is to mold foamed products continuously at high speeds in a relatively simple and inexpensive apparatus that is easily serviced and dependable and is reliable and economical of materials and space.

Another object of the invention is to mold continuous lengths of foamed strips in large quantities relatively quickly and cheaply.

Another object of the invention is to make maximum use of materials and space in molding continuous lengths of foamed plastic strips in large quantities at high speeds.

Another object of the invention is to mold foamed plastic strips continuously at high speeds in apparatus that is automatic and easily operated and serviced.

Other objects of the invention will be apparent hereinafter from the specification and from the recital of the appended claims. To these and other ends, the invention resides in certain improvements all as will be hereinafter more fully described, the novel features being pointed out in the claims at the end of this specification.

SUMMARY OF THE INVENTION

Generally, the invention comprises continuous molding of a length of foamed product such as polyurethane strip by use of relatively long continuous strip mold portions that are snap-fitted together to contain the foamed product and that are driven in interlocing relation through a path longer than one half the length of either of the mold halves and that are driven in interlocking relation through a path is preferably arranged by disposing one mold half inside the other, and the path is preferably made relatively long by including several turns or loops. By such an arrangement, the mold can be filled and driven at a relatively high rate of speed, and the closed path extends for a sufficient length to provide the necessary curing time for the molded product.

The mold portions according to the invention are arranged to interlock with sufficient tenacity to maintain the foamed product within a closed cavity without requiring external support for the mold portions. Also, the mold according to the invention is preferably rigid enough when interlocked to bridge unsupported reaches of travel and is preferably flexible enough to be bent through a curve without stressing the foaming product so as to impair its development. Mold portions having such desirable characteristics are preferably extruded of synthetic plastic materials and bonded to form the necessary continuous lengths.

DETAILED DESCRIPTION

The inventive method is suited for continuous molding of a variety of materials in endless strip forms of many cross-sectional configuration. Such strips have many applications in weatherstripping, beading, trimming, gaskets, seals, and the like, and are demanded in quantity. Molding according to the invention can be applied to a variety of foamable materials including, but not limited to, synthetic resins such as polyurethane. In forming foamed products of such materials, a foamable mixture is deposited in a mold and expands to fill the mold by forming gaseous bubbles in the foamed material. To be self-sustaining and useful for practical applications, such foamed material is set or cured by heating such as at temperatures of from 170° to 180° Fahrenheit for 10 to 15 minutes. Of course, the invention is not limited to any particular foamable material or curing time or temperature.

Throughout the drawings, corresponding parts are indicated by the same reference numerals. FIGS. 1–20 show one preferred embodiment of the invention as applied to the molding of half-round polyurethane foam strips in continuous lengths. However, it is to be understood that the particular apparatus illustrated is only one of a great number of embodiments of the invention and that apparatus and method may take many other forms and steps, and products other than a half-round strip can be manufactured within the spirit of the invention.

The mold

Figure 4:
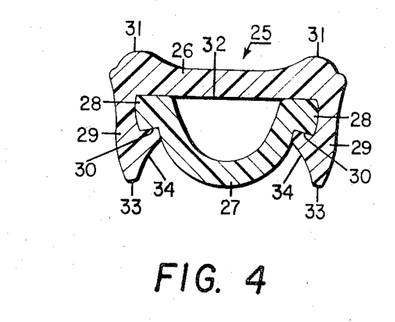
FIG. 4 shows a cross-section of mold portions according to the invention.
Figure 5:
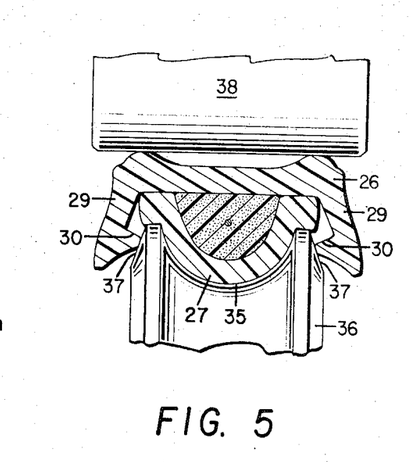
FIG. 5 shows the mold portions of FIG. 4 in the process of being closed together.

The inventive method requires a continuous mold, and a preferred embodiment of the mold itself, as best shown in FIGS. 4 and 5, will be described first.

The illustrated mold 25 is formed of two sections or portions 26 and 27, one of which, such as mold portion 27, is preferably formed as a trough for continuously receiving a bead of foamable material. It is preferred that mold portions 26 and 27 be configured to snap fit together in an interlocking relation, and to this end, mold portion 27 is provided with side flanges 28 extending outward adjacent its edges, and mold portion 26, a section 32 of which forms a cover for the trough of mold portion 27, is provided with side walls 29 extending downward over flanges 28. Side walls 29 are preferably provided with hook portions 30 extending inward under flanges 28 when the mold portions are interlocked together. Raised ribs or ridges 31 on mold portion 26 strengthen the juncture of side walls 29 with cover portion 32 and provide bearing surfaces for various drive and guide means in the inventive apparatus.

From the lower extremities 33 of side walls 29, a preferably tapered surface 34 leads to hook portion 30 to provide a surface by which the side walls 29 of mold portion 26 can be spread apart for opening or closing the mold 25. The spreading apart of side walls 29 and hook portions 30 is best shown in FIG. 5 where a central portion 35 of wheel 36 supports the trough portion of mold portion 27, while the rim portions 37 of wheel 36 force apart the side walls 29 of mold portion 26 as it is pressed downward by roller 38. Mold portions 26 and 27 can be separated merely by being forced apart by rollers at an appropriate point in their travel, and it is possible within the spirit of the invention to snap fit these mold portions together without the aid of spreading wheel 36. Also, other interlocking configurations are possible within the spirit of the invention.

It is preferred that mold portions 26 and 27 be extruded of a synthetic plastic resin such as polyolefins including polyethylene, polypropylene, or mixtures of these or other materials. A satisfactory mold material is essentially an alloy of propylene and ethylene and is preferably formed as a smooth-surfaced extrudate. The preferred material for a mold according to the invention has a waxy, unctuous surface for ready release of the molded product and is preferably not only rigid enough for a secure interlock between the mold portions to retain the foaming material within the mold cavity but also flexible enough to be driven through the required curved path. Extruded mold portions 26 and 27 have their ends welded or bonded together to form continuous lengths according to the invention.

Mold-handling method

Figure 1:
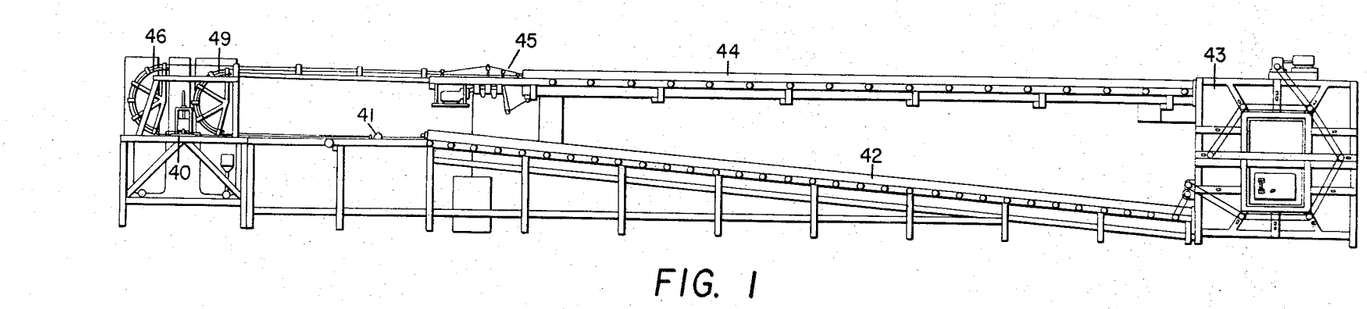
FIG. 1 shows a side elevation of continuous molding apparatus according to the invention.
Figure 2:
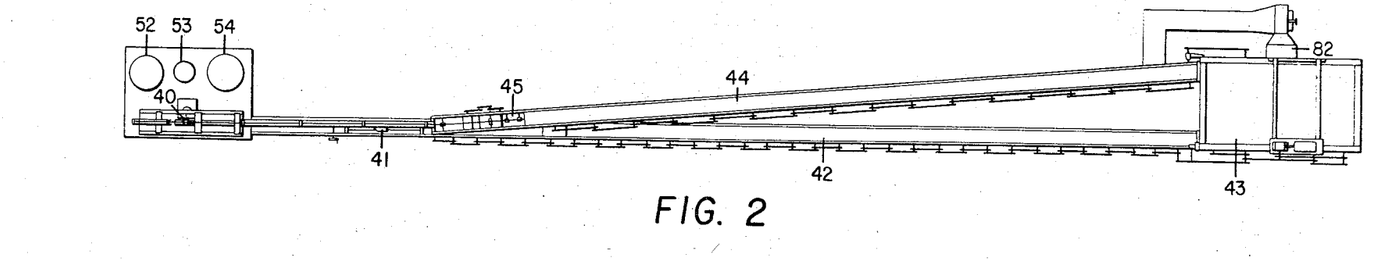
FIG. 2 shows a plan view of the apparatus of FIG. 1.

Turning now to mold handling according to the invention, the illustrated embodiment of the apparatus according to the invention is shown in its entirety in FIGS. 1 and 2, and the other views show various details of this apparatus.

Referring to FIGS. 1 and 2, the bead of foamable material is deposited in the mold at a filling station 40. The mold portions are closed together and interlocked at a mold closing station 41, the interlocked mold portions are then driven through a first oven 42 into a main oven 43 where they move through a helical path, and then into a third oven 44. After emerging from oven 44, the mold portions are separated at a separating station 45, and the cured product is removed from the mold. Of course, the arrangement of ovens and paths can be varied within the spirit of the invention.

The downward incline or slope of the mold in passing through oven 42 is preferred to assist in allowing gas to escape freely from the foaming product contained within the mold. The linear traverse of the mold through oven 42 allows the material to foam to fill the mold cavity and gives the material a preliminary curing or gel so that it can bend through the helix in oven 43 without any detriment to the foamed product. Generally, a foam such as polyurethane must be handled gently and not stressed or disturbed during curing to produce the best quality finished product. In this connection, the helical path through oven 43, as more fully described below, is preferred in that the mold and the curing product contained within its cavity are bent about a constant radius during a considerable length of travel for undisturbed curing.

In considering the details of the illustrated embodiment of the invention, the sequence of the inventive method will be followed from the point of filling the mold to the point of removal of the cured product.

Figure 3:
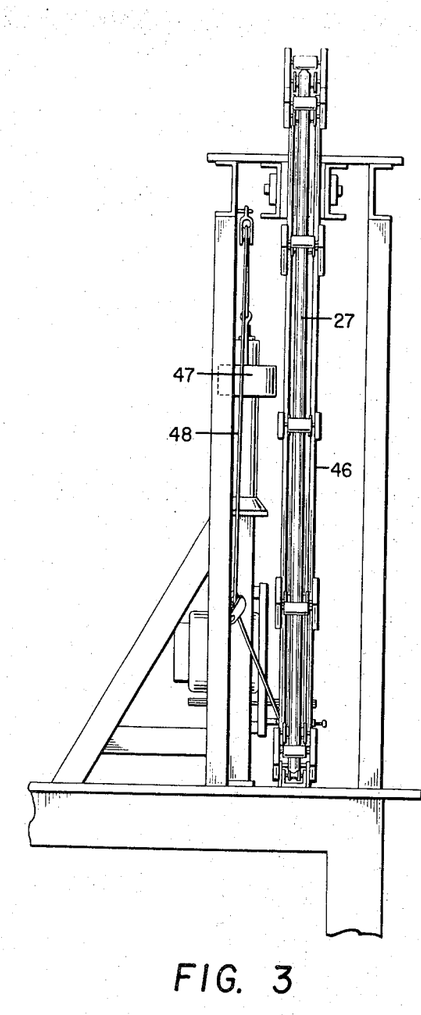
FIG. 3 shows a partial end elevation of the left end of the apparatus of FIG. 1.

Filling station 40 is located at the open portion of the mold path where mold portions 26 and 27 are separated, and station 40 is near the left end of the apparatus illustrated in FIGS. 1 and 2. FIG. 3 shows an end elevation of this end of the apparatus with bottom or trough mold portion 27 guided over tensioning arc 46 which is urged outward by weight 47 acting on cable 48 to tighten or remove slack from mold portion 27. A similar tension arc 49, best shown in FIG. 6, is biased by weight 50 pulling on cable 51 to tension upper mold portion 25.

Figure 6:
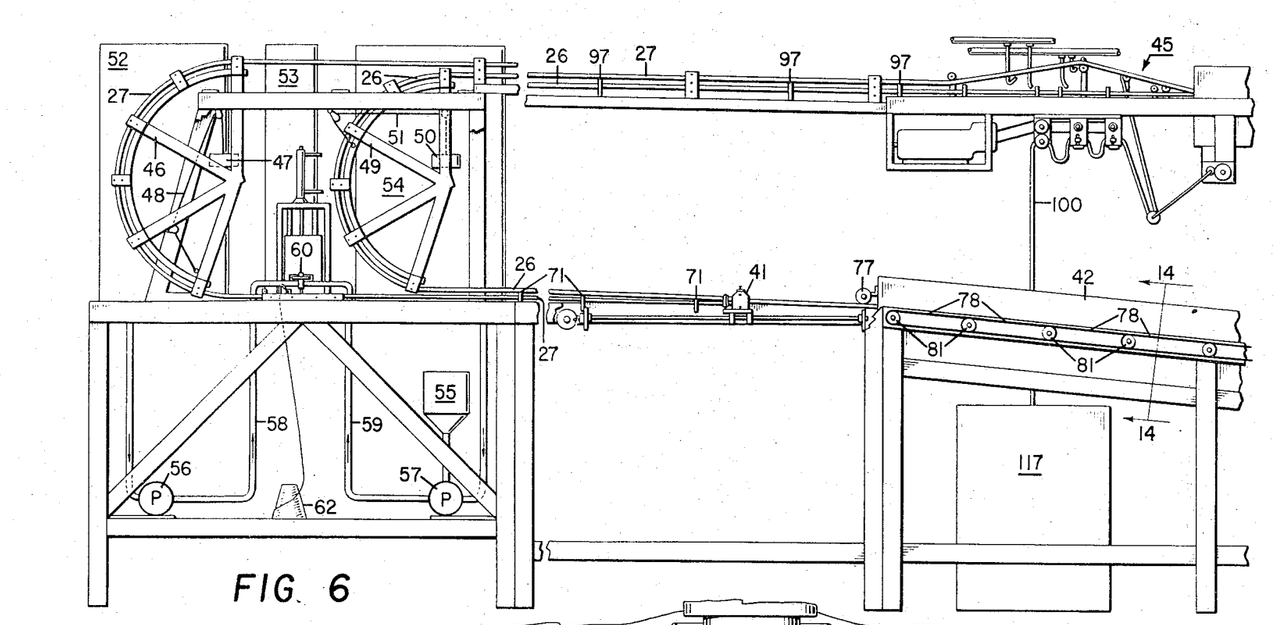
FIG. 6 shows a partial side elevation of the apparatus of FIG. 1 on an enlarged scale.

As shown in FIG. 6, tanks 52-55 are provided for various compounds, solvents, or ingredients for providing a foamable mixture to be molded according to the invention. Of course, such tanks will contain various materials depending upon the foamed product, and for the illustrated embodiment of the invention, contain the materials necessary for a foamable polyurethane. Pumps 56 and 57 force ingredients through lines 58 and 59 to mixing head 60 where the materials are accurately mixed and metered for delivery to trough mold portion 27. Also, for many applications of strips molded according to the invention, it is desirable to embed a strengthening cord, a wire, or mesh wire in the foamed product, and to this end, a winding of cord 62 is positioned so that the cord is fed to the filling station for inclusion within the molded product.

Figure 7:
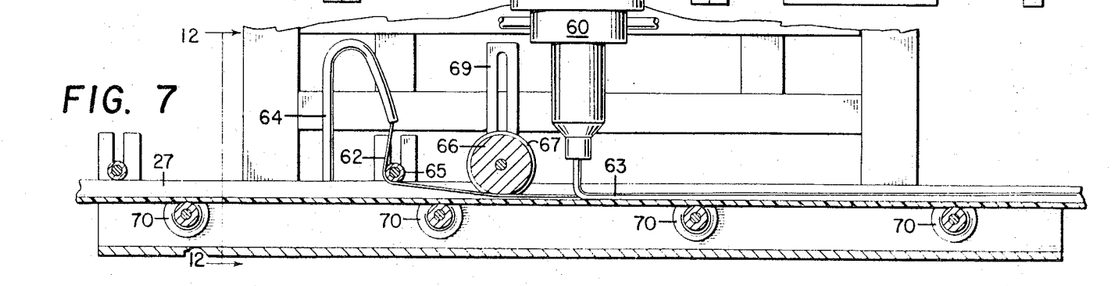
FIG. 7 shows an enlarged view partially in section of the mold filling station of the apparatus according to the invention.
Figures 12, 13:
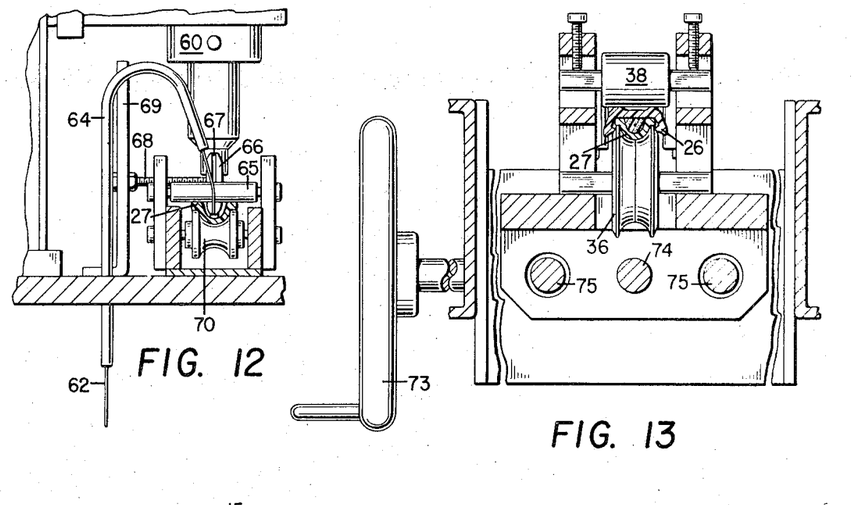
FIG. 12 shows a partial cross-sectional view of mold filling apparatus according to the invention taken along the line 12—12 of FIG. 7.
FIG. 13 shows a partial cross-sectional view of mold closing apparatus according to the invention taken along the line 13—13 of FIG. 8.
Figure 14:
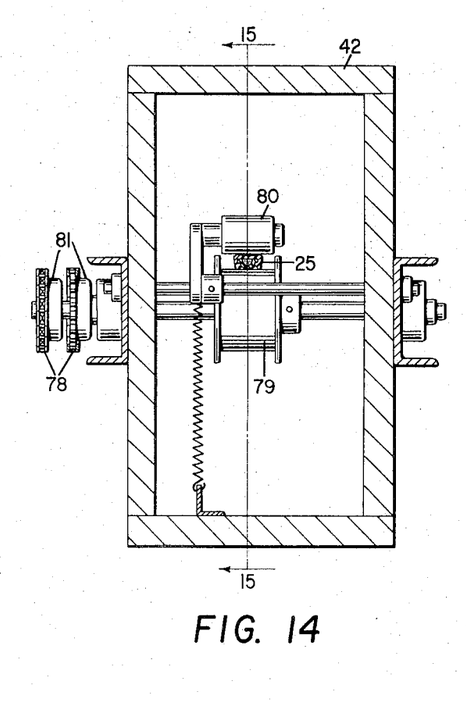
FIG. 14 shows a partial cross-sectional view of mold driving and guiding apparatus within an oven according to the invention taken along the line 14—14 of FIG. 6.
Figure 15:
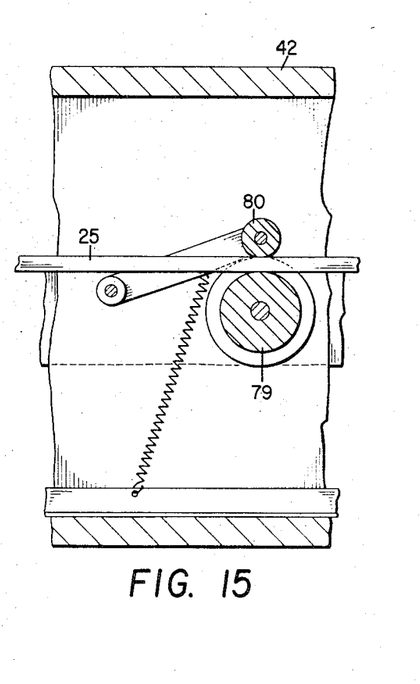
FIG. 15 shows a partial cross-sectional view of the mold guiding and driving apparatus of FIG. 14 taken along the line 15—15.

The depositing of foamable mixture in mold portion 27 is best shown in FIGS. 7 and 12. Mold portion 27 is moved through the illustrated filling station with uniform speed, and mixing head 60 is arranged for accurately metering a bead 63 of material to be delivered to the trough of mold portion 27. Cord 62 is guided through tube 64, under roller 65, and under guide wheel 66 for accurate positioning, guide wheel 66 has a peripheral slot 67 for steering cord 62 and is preferably adjustable both vertically and horizontally by means of threaded rod 68 and adjustment bracket 69. Support rollers 70 which are preferably shaped to conform to the outside of mold portion 27 carry mold portion 27 continuously past mixing head 60 for receiving bead 63 of mixture and cord 62. Driving means for advancing the mold are preferably located beyond filling station 40 as will be described below. The bead 63 of foamable material begins to foam and expand as soon as deposited in mold portion 27, so that its volume increases as it moves toward mold closing station 41.

As best shown in FIG. 6, upper mold portion 26 is guided to a position immediately above lower mold portion 27 as the mold portions approach mold closing station 41. In such a relationship, mold portions 26 and 27 are disposed for snap-fitting together in an interlocked relation.

It is preferred according to the invention that the foamable material be expanded to a volume sufficient for filling the closed mold at the point at which the mold portions are interlocked together. This allows the escape of gasses formed during the foaming process and yet accomplishes mold closure before the volume of the foamed material exceeds that of the mold cavity, so that the mold portions are readily snap-fitted together. Thus, for various molding operations and speeds, it is desirable that the mold closure station 41 be adjustable longitudinally of the mold path, and it is possible within the spirit of the invention that mold closure take place within oven 42 on the downwardly inclined reach leading to the helical path in the main oven 43 (FIG. 1). Until the location for optimum mold closure is reached, mold portions 26 and 27 are held apart and guided by guides 71.

Figure 8:
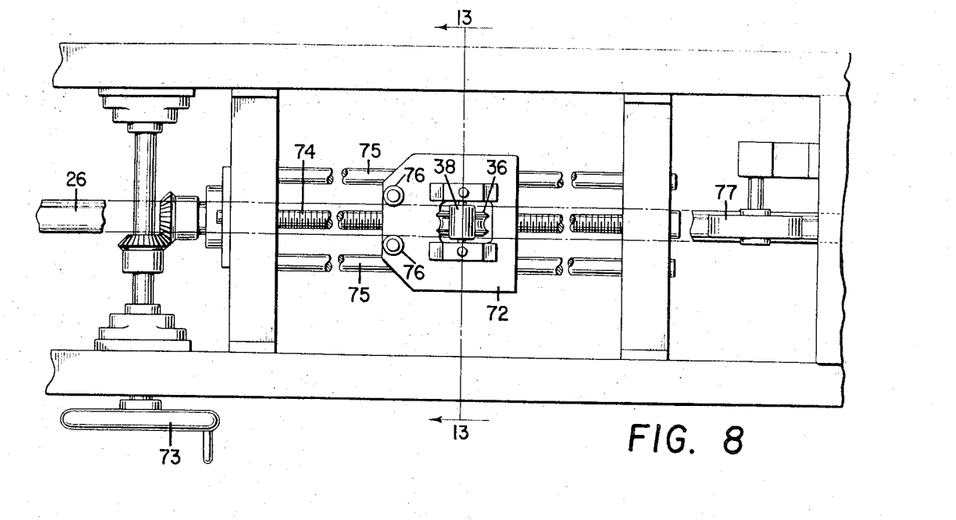
FIG. 8 is a partial plan view showing a mold closing device according to the invention.

The details of mold closure are best shown in FIGS. 5, 8 and 13. FIG. 8 shows the longitudinally movable closure carriage 72 on which is mounted a mold closure device according to the invention. Carriage 72 is moved longitudinally by means of crank wheel 73 and driven screw 74 while supported by guide rods 75. Such longitudinal adjustment allows positioning of the mold closure device at precisely the desired point at which the volume of the foaming material equals that of the mold cavity.

Mold portions 26 and 27 can be snap-fitted together by forcing them into engagement with each other, but it is preferred to spread the side walls of mold portion 26 as the mold portions are pressed together for smoother snap-fitting. To this end, generally vertically disposed guide rolls 76 align mold portion 26 with spreading wheel 36 which operates as described above and as shown in FIGS. 5 and 13. Simultaneously with the spreading of its side walls, mold portion 26 is pressed downward by vertically adjustable roller 38 into engagement with lower mold portion 27 which is supported by the concave periphery of roller 36 so that as the mold portions leave rollers 38 and 36, they are in interlocking engagement with each other. Of course, other mold closure devices can be used within the spirit of the invention, it merely being preferred that the mold portions be forced into a snap-fitted, interlocking relation.

After being snap-fitted into a closed position, the mold containing the foaming mixture is guided into downwardly inclined oven 42 as shown in FIGS. 1 and 6. It is preferred that the path of the mold through oven 42 be downwardly inclined to facilitate the escape of gas from the foaming product, but the invention can be practiced without using such an incline.

As best shown in FIGS. 6, 8, and 14-16, mold 25 and its contents are driven and guided through oven 42. Guide wheel 77 controls the entry of mold 25 into oven 42, and chains 78 powered by drive motor 83 through gearing 94 are arranged along the outside of oven 42 for driving the mold at various contact points throughout oven 42. A plurality of driven rollers 79 and associated pressure rollers 80 grip mold 25 at spaced locations along oven 42 and guide and drive it forward. Pulleys 81 spaced along the outside of oven 42 indicate the points at which driven rollers 79 are located within oven 42 for advancing mold 25. From this and from FIG. 15, it is clear that mold 25 is self-supporting from one drive roller 79 to the next, and that mold 25 is sufficiently rigid to span the reach between rollers 79. Since the foaming material places some separating pressure on the two portions of mold 25, sufficient interlocking strength to retain the foamed material is desirable for the linear run through oven 42.

Figure 16:
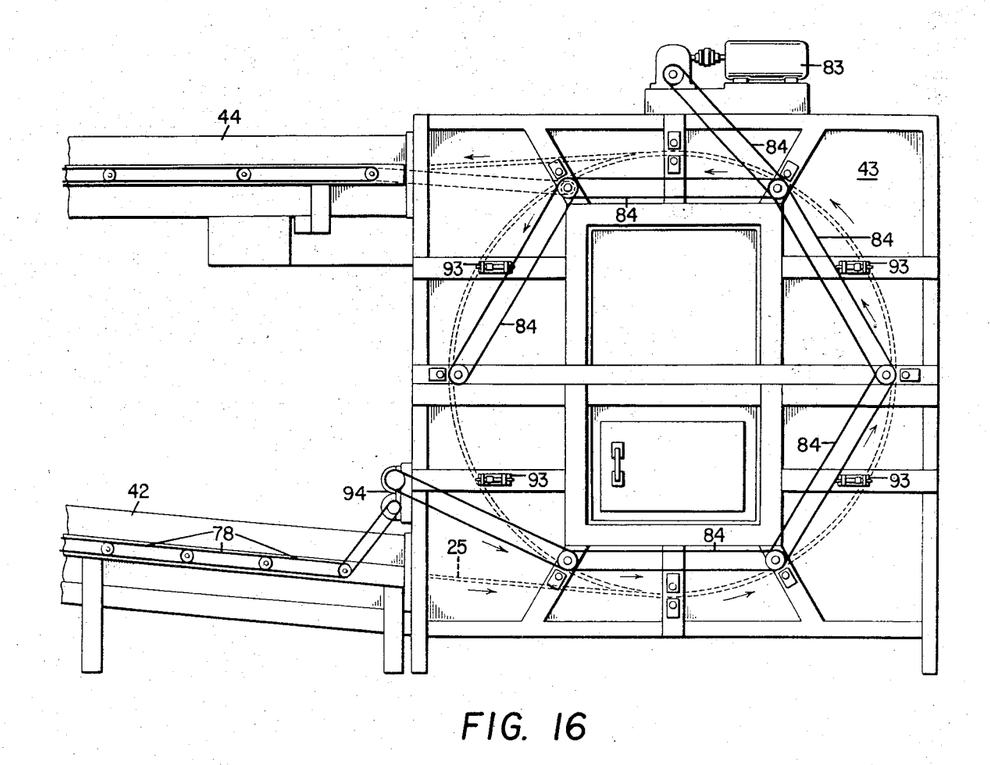
FIG. 16 shows a side elevation of a curing oven according to the invention.

Preferably, a central forced air heating system 82 (FIGS. 2 and 18) is arranged for circulating heated air not only to oven 43, but to ovens 42 and 44 as well. As best shown in FIG. 16, heat from oven 43 can be forced into oven 42 through their open connection with each other.

Figure 9:
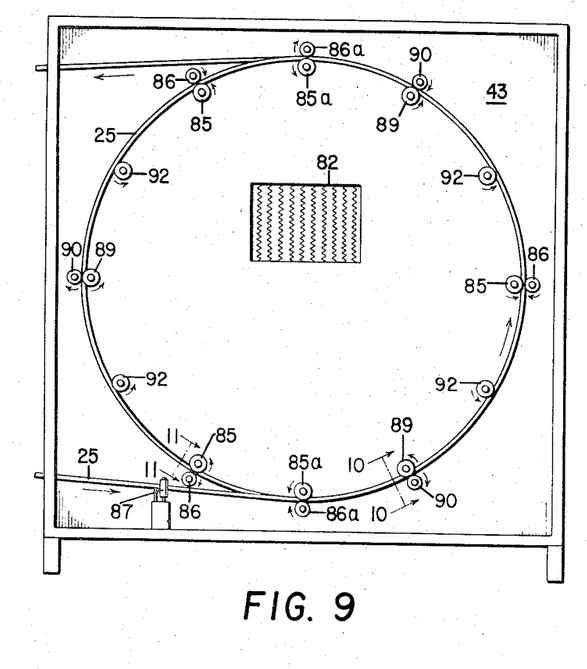
FIG. 9 shows a side elevation of a curing oven according to the invention with its side removed.
Figures 18, 19, 20:
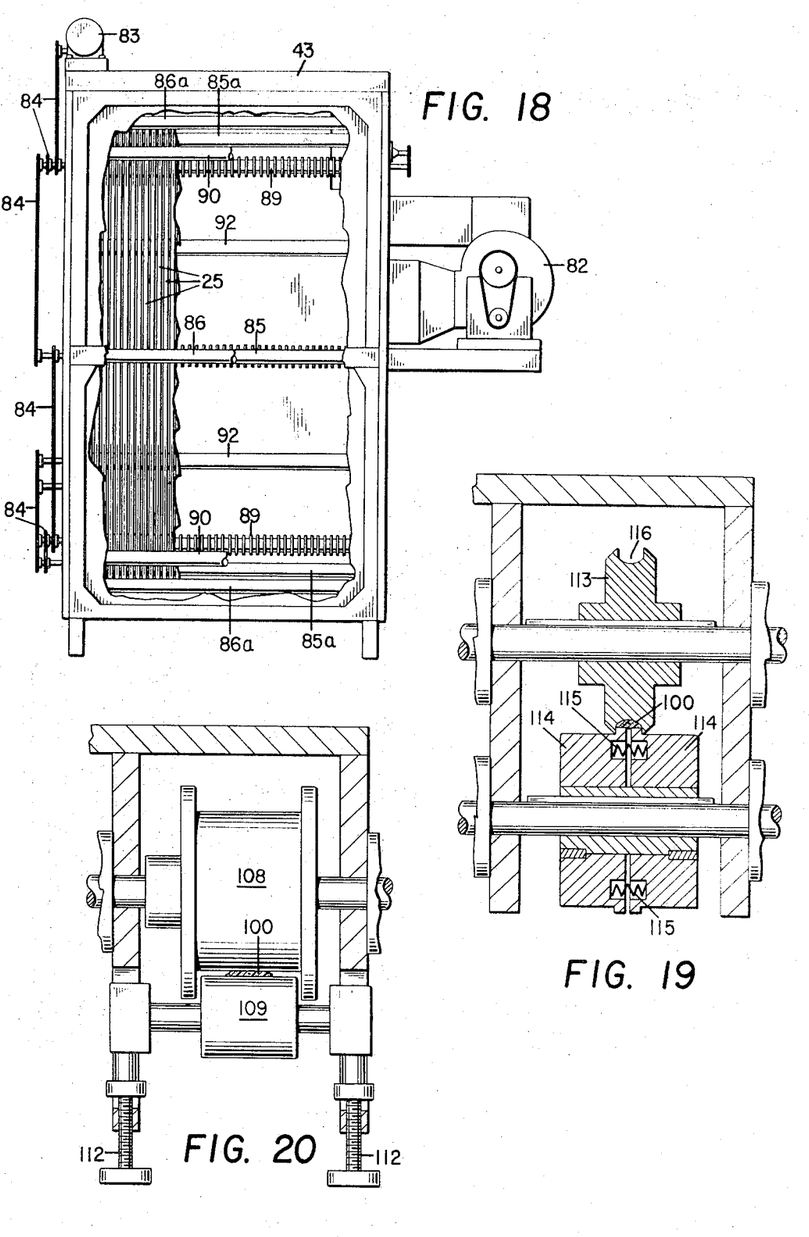
FIG. 18 shows a cut-away end elevation of the oven of FIGS. 9 and 16.
FIG. 19 shows a partial cross-sectional view of a flashing trimmer according to the invention and taken along the line 19—19 of FIG. 17.
FIG. 20 shows a partial cross-sectional view of squeeze rolls according to the invention and taken along the line 20—20 of FIG. 17.

After passing through oven 42, mold 25 enters oven 43 best illustrated in FIGS. 9, 16, and 18. By this time, the foaming material in mold 25 has preferably completed its expansion and has achieved a sufficient gel or set so that it can be bent into a curved path. The foamed product at this point requires several more minutes of curing at a temperature of about 180° Fahrenheit before it is ready to be removed from mold 25. As mentioned above, heating unit 82 is preferably arranged for forcing heated air in thorough circulation throughout oven 43 to accomplish curing of the foamed product.

Because of the flexibility of mold 25, it can be bent through a closed curve and is preferably driven within oven 43 in a helix each turn of which is of uniform radius. This allows mold 25 to be bent upon its entry into oven 43 into a radius of curvature constantly maintained throughout its travel through the helix in oven 43. The result is that one gentle bend is applied to mold 25 and its foamed contents for minimum stress and agitation of the contents, and such bend is maintained undisturbed for several minutes of travel through oven 43.

Figure 11:
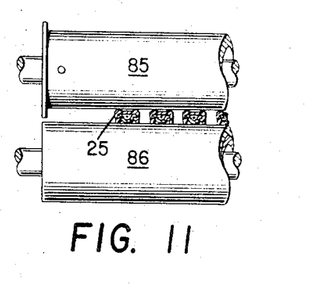
FIG. 11 shows a partial end elevation of mold drive rolls located in the oven of FIG. 9.

Mold 25 is preferably driven through the helix in oven 43 by a drive motor 83 powering chains 84 which drive rollers 85 extending through oven 43. As shown in FIG. 16, six driven rollers are arranged within over 43, but of course, any suitable number of drive rollers can be used. As shown in FIGS. 9 and 11, each roller 85 is provided with an associated pressure or counter roller 86 that is preferably spring loaded to urge mold 25 against drive rollers 85.

Figure 10:
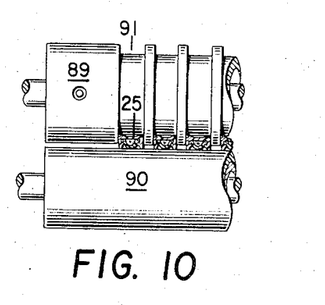
FIG. 10 shows a partial end elevation of mold guide rolls located in the oven of FIG. 9.

In adjusting the lateral spacing of each convolution of the mold in its helical path in oven 43, mold 25 is first guided into an initial position by generally vertically disposed guide roller 87 shown in FIG. 9. From guide 87, mold 25 is bent into its radius of curvature between the lowermost set of idler support rolls 85a and 86a and driven guide rolls 89 and 90 where the mold enters the first of a plurality of channels 91 in guide roll 89 as best shown in FIG. 10. Pressure roll 90 urges mold 25 against guide roll 89 and keeps mold 25 within the desired slot or channel in guide roll 89. It is preferred that other sets of channeled guide rolls 89 and associated pressure rollers 90 be provided about the helix in oven 43, and such other sets are shown at 120° angles from each other. Of course, additional or fewer guide rolls can be used, and guide rolls can be idled as well as driven. Also, it is possible within the spirit of the invention for each turn of the mold 25 in the helix in oven 43 to bear against each successive turn without the spacing provided by guide rolls 89. However, heating is enhanced by the resulting spacing, and deviation from the desired path is prevented by selective use of guide rolls 89. Turns of the mold 25 in the helix of oven 43 are best shown in the partially cutaway view of FIG. 18.

It has been found that extrudate mold portions according to the invention stretch or elongate in use, and it is desirable to take up the resulting slack in mold 25. A preferred location for such take-up is in oven 43, and take-up rolls 92 are provided inside the helix for urging mold 25 outward toward a slightly larger radius. Extremely strong bias springs or preferably pneumatic bias means are preferred for forcing the many turns of the helix outward. Such bias means 93 for take-up rolls 92 are shown in FIG. 16.

As mold 25 traverses the many turns of the helix in oven 43, it moves from left to right as illustrated in FIG. 18 and leaves oven 43 at the left side as best shown in FIG. 2 and enters oven 44. Oven 44 is similar to previously described oven 42 in providing drive means for advancing mold 25 and in being in communication with central heating source 82 for continuing the heat curing of the foamed product in mold 25. The drive means within oven 44 is preferably powered by drive means 83 previously described for driving the mold through the helix in oven 43.

Figure 17:
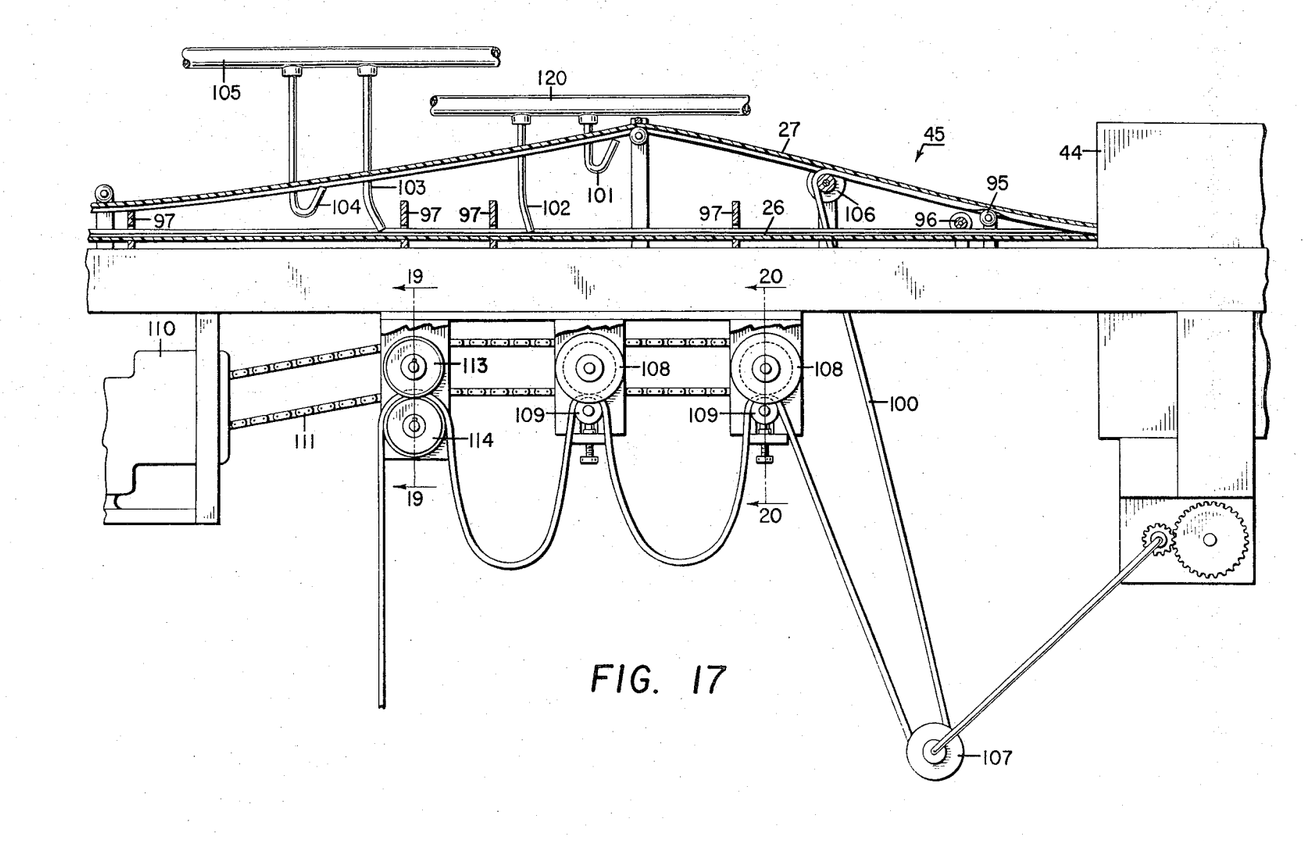
FIG. 17 shows a partial side elevation of mold opening and cleaning apparatus and molded product processing apparatus according to the invention.

After leaving oven 44, mold 25 enters separating station 45 best shown in FIGS. 6, 17, 19, and 20. As best shown in FIG. 17, through mold portion 27 and cover mold portion 26 are separated by being forced apart by separating rollers 95 and 96. From this point onward, mold portions 26 and 27 are guided through the foaming and curing cycle. To this end, guides 97 (FIG. 6) direct each respective mold portion toward tensioning arcs 46 and 49 where their paths are separated.

After opening the mold and removing the cured product 100 therefrom as illustrated in FIG. 17, it is preferred that the mold portions be cleaned before running through another cycle. For this purpose, jets 101 and 102 direct air from air line 120 against mold portions 27 and 26 respectively to remove any flashing or scrap material remaining in the mold. It is also preferred that jets 103 and 104 direct a cleaning fluid from line 105 into the cavities of the separated mold portions. It is preferred that such cleaning fluid spray be directed into the corners of mold cover portion 26 to remove any flashing bits therein, and one preferred cleaning fluid is an extremely fine spray of a silicone release fluid which not only cleans the mold, but coats it with a silicon and wax residue which makes mold opening and release of the molded product easier on the next molding cycle. Of course, a variety of mold cleaning and coating operations can be accomplished as desired at the mold opening station 45, and the invention is not limited to any particular cleaning fluid or method or coating operation.

In addition to the previously described tension arcs 46 and 49 for tensioning and taking up slack in mold portions 26 and 27, it is possible to introduce other or additional such slack take-up devices conveniently between mold opening station 45 and filling station 40. Take-up devices biased by weights can conveniently be arranged immediately beyond mold opening station 45.

As best shown in FIG. 17, cured product 100 is led around pulley 106 for removal from mold portion 27 and is then guided under tension pulley 107 which is preferably biased downward to place product 100 under predetermined tension.

Subsequent to its removal from the mold, cured product 100 is preferably trimmed to remove flashing and squeezed to destroy any shrinkable intact gas bubbles remaining within it. These operations can be done in any desired order, and in the illustrated embodiment, the product is first squeezed, and then trimmed.

Squeezing of the cured product is preferred because occasionally intact bubbles or relatively hot gas remain in the cured product, and as such gas bubbles cool, they can produce shrunken spots in the final product which detract from its appearance and value. Squeezing can rupture any such bubbles, prevent any such shrinking, and result in a more attractive and functional product.

In the illustated embodiment, a pair or flanged squeeze rolls 108 and associated pressure rolls 109 are arranged in series for successively squeezing the cured product 100. It is preferred that squeezers and trimmers be driven by a single drive unit 110 transmitting power through chain 111 so that the squeezers and trimmers are all driven at a uniform speed.

As best shown in FIG. 20, pressure roll 109 is preferably vertically adjustable for a predetermined tension against flanged squeeze roll 108 to give the desired squeezing or crushing treatment to the foamed strip. Such adjustment is preferably accomplished by adjustment bolts 112.

Trimming is preferably accomplished by a continuous trimming shear preferably having a boundary wheel 113 and a pair or shearing wheels 114 best illustrated in FIG. 19. Shearing wheels 114 are preferably biased apart from each other by springs 115 for urging the shearing wheels 114 against the inside edges of boundary wheel 113 with predetermined force. As wheel 113 rolls with wheels 114, the edges of the channel 116 in wheel 113 sever the flashing off product 100 and leave its edges trimmed to a predetermined uniform dimension. After triming, the finished product 100 is preferably allowed to drop downward into a box 117 or other container, but of course, product 100 could be wound or spooled after trimming as desired.

It can be seen that according to the invention a relatively long length of mold filled with curing product can be driven through ovens 42-44 so that molding can proceed at a relatively high speed and the desired curing time can still be obtained. Thus, with 48 turns of mold in a helix of four foot radius, in addition to the mold running through ovens 42 and 44, it has been possible to operate the illustrated apparatus at molding speeds of 100 feet per minute with curing times of 12 minutes for the foamed product. Although such speeds at present require over 1000 feet of mold, they exceed by far any speed obtained with prior art apparatus. Furthermore, with product improvement, and different or improved curing, it may be possible to reduce the total length of mold required or speed up the molding rate with the inventive apparatus. Although a relatively long length of mold is required, according to the invention, such a mold length is not unreasonably burdensome or difficult to handle because of the self-supporting and interlocking and flexing characteristics of the mold, none of which were available with prior art structures known to the applicant.

The apparatus of FIGS. 1-20 uses one of several preferred mold paths providing a curve in the closed portion of the path. Other preferred mold paths and oven arrangements are illustrated schematically in FIGS. 21-25. Variations on these arrangements are also possible.

Figure 21:
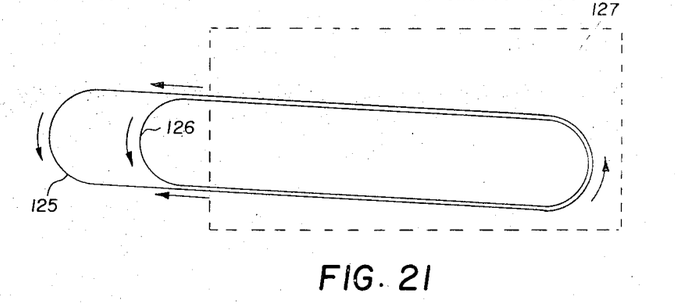
FIGS. 21–25 are schematic side elevational views of various mold paths, curves and oven arrangements within the spirit of the invention.

Outer mold part 125 follows an oblong continuous loop around inner mold part 126 as shown in FIG. 21. an oven 127 is arranged to heat the closed portion of the path of mold parts 125 and 126. The initial reach of the closed portion of the mold path is downwardly inclined into oven 127 to allow the gaseous escape from the foam product as described above. The curves at the ends of the path for mold parts 125 and 126 are of approximately equal diameter and extend through substantially 180°.

The curve-within-a-curve arrangement shown in FIG. 21 is preferred to make the closed portion of the mold path a maximum length relative to the total mold length. This conserves on the required mold, space and heating equipment.

Figure 22:
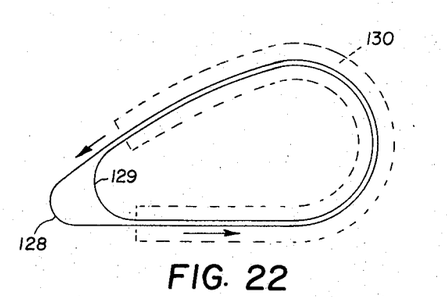

The mold path illustrated in FIG. 22 is similar, but the curvature radii differ at opposite ends of the closed loops. Outer mold part 128 forms a continnous obling loop around inner mold part 129, and oven 130 is generally horseshoe shaped to enclose the closed portion of the mold travel. Ovens or heating means along the closed portion of the mold portion can be unitary, multiple, or arranged in a variety of ways to cure the foamed product.

Figure 23:
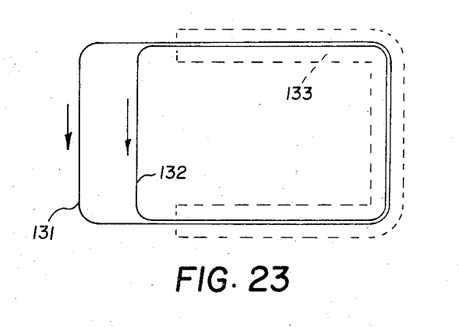

In FIG. 23, outer mold part 131 follows an approximately rectangular path around inner mold part 132. Such an arragement requires relatively small radius turns separated by linear lengths of travel. Instead of approximately 180° turns at the ends of the oblong as illustrated in FIG. 1, such ends include two 90° turns. Variations on the curvatures in the mold path according to the invention can range through any curves between FIGS. 21 and 23, and the pairs of 90° turns at the ends of the path in FIG. 23 are equivalent to the 180° turns at the ends of the path of FIG. 21. Oven 133 of FIG. 23 is formed in an approximate U shape to heat the closed portion of the mold path. Oven 33 can readily be divided into three linear ovens if desired.

Figure 24:
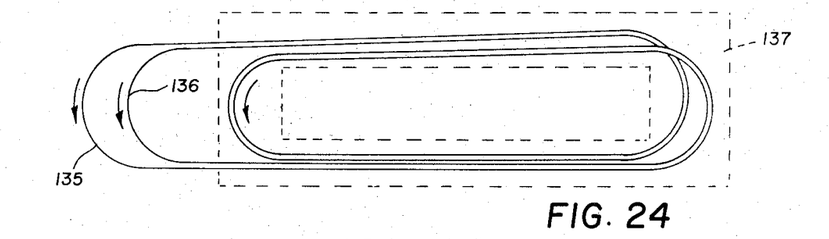

FIG. 24 shows a multi-loop version of the mold path of FIG. 21. Outer mold part 135 forms a continuous loop around inner mold part 136, and at least one doubling back of such loop is provided. Oven 137 is arranged in an open-centered rectangle to surround the closed portion of the mold path. The general path illustrated in FIG. 24 can save space and increase efficiency over the helical path version illustrated in FIGS. 1-20. The oblong oval loop of the closed portion of the mold path can be repeated for any desired number of turns, and a greater length of mold can be run through such an oblong path for the overall height and width of the machine than can be accommodated in the circular helical path previously described.

Figure 25:
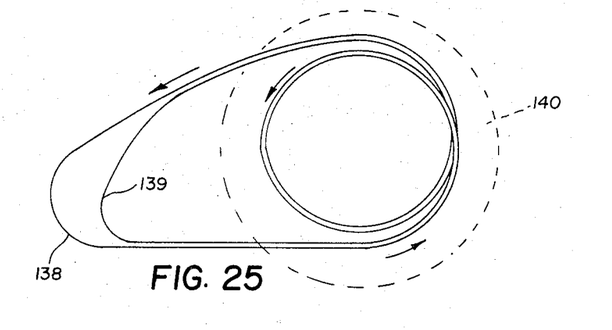

FIG. 25 shows a multi-loop closed portion of mold path similar to the single loop path of FIG. 22. Outer mold part 138 forms a closed loop around inner mold part 139, and a generally cylindrical oven 140 encloses the closed portion of the mold path. Complete loops of interlocked travel of the mold can be repeated for as many loops as desired. The relatively large radius of the closed loop portion of the mold travel allows gentle bending of the mold while the foamed product is contained within the mold cavity. The relatively smaller radii of the curves at the open portion of the path is possible since the foamed product is not contained within the mold cavity at that point.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, many different heating arrangements and many mold paths, mold driving equipment, guides, rollers, tensioning dvices, mold separating and closing equipment, mold and product cross sections, and mold cleaning gear can be used within the spirit of the invention .

I claim:

1. A method of continuously molding a foamed product, said method comprising:
    (a) depositing a foamable mixture in a first continuous mold strip;
    (b) covering said first mold strip with a continuous second mold strip adapted to snap-fit into interlocking relation with said first mold strip to form an elongate mold cavity;
    (c) moving said interlocked mold strips through a path longer than one-half the lengths of either of said mold strips;
    (d) said path including a curve of at least substantially 180°;
    (e) heating the environment of said path to cure said foamed product;
    (f) separating said mold strips; and
    (g) removing the cured foamed product from said mold strips.

2. The method of claim 1 including depositing said foamable mixture at a rate that results in said mixture expanding to a volume substantially equal to that of said cavity before said first mold strip is covered.

3. The method of claim 1 including driving said interlocked mold strips through a helical path the environment of which is heated.

4. The method of claim 1 including guiding a continuous strand into said foamable mixture so that said strand is enclosed within said foamed product.

5. The method of claim 1 including driving said first mold strip past means for said depositing of foamble mixture, and continuously pressing said first and second mold strips into said interlocked relation beyond the region of said depositing of foamable mixture.

6. The method of claim 5 including depositing said foamable mixture at a rate that results in said mixture expanding to a volume substantially equal to that of said cavity before said first mold strip is covered.

7. The method of claim 6 including guiding a continuous strand into said foamable mixture so that said strand is enclosed within said foamed product.

8. The method of claim 6 including driving said interlocked mold strips through a helical path the environment of which is heated.

References Cited
UNITED STATES PATENTS
2,817,875   12/1957   Harris et al. _________ 264—47

MAURICE J. WELSH, Primary Examiner

U.S. Cl. X.R.

264—48